INVENTORS.
IVAN TOLSTOY
THEODORE E. POCHAPSKY
BY
Philip Schneider
ATTORNEY

United States Patent Office
3,230,356
Patented Jan. 18, 1966

3,230,356
DEVICE FOR ANALOGUE SOLUTION OF DIFFERENTIAL EQUATIONS
Theodore E. Pochapsky, Blauvelt, and Ivan Tolstoy, New York, N.Y., assignors to the United States of America as represented by the Secretary of the Navy
Filed Apr. 27, 1962, Ser. No. 190,841
7 Claims. (Cl. 235—182)

This invention relates to a device for the analogue solution of differential equations.

The application of electrical and mechanical devices to the solution of equations in the field of computers and "giant brains" is well known. The basic unit of the present device can be made to represent and solve the general non-homogeneous differential equation with variable coefficients of either the first or second order. By appropriate combinations of these basic units, differential equations of any order can be solved. The solution obtained is in the analogue form.

A second order, non-homogeneous differential equation with variable coefficients might have the following form:

$$\ddot{\theta} + r(t)\dot{\theta} + s(t)\theta = f(t)$$

where $\ddot{\theta}$ is the second derivative of the angle $\theta$ with respect to time
$\dot{\theta}$ is the derivative of the angle $\theta$ with respect to time
$r(t)$ is a function $r$ of time
$s(t)$ is another function $s$ of time
$f(t)$ is another function $f$ of time, sometimes called the driving function.

The basic unit of the invention can be designed to solve equations of this type in terms of the angle $\theta$, or, in other words, in terms of the angle of rotation of a shaft from a reference position.

The basic unit of the invention comprises a group of three coils coupled to the same shaft, the coils being placed in a time-invariant, uniform intensity (hereinafter called "uniform") magnetic field so that, in the absence of driving currents in the coils, the plane of one coil is perpendicular to the direction of the field while the planes of the other two coils are parallel to the field. Predetermined driving currents are sent through two of the coils causing the coil system to rotate in the magnetic field. Another current, an induced current initiated by rotation of the third loop in the field, is fed back to one of the first two coils, the electrically coupled coils being the two whose planes are parallel to the direction of the magnetic field.

The interaction of the uniform magnetic field with the magnetic fields produced by these currents causes a rotation of the shaft to which the coils are attached, the angle of rotation, $\theta$, of the shaft being the solution of a differential equation.

An object of this invention is the analogue solution of non-homogeneous differential equations with variable coefficients.

Another object is to provide a simple, inexpensive device for the analogue solution of non-homogeneous differential equations with variable coefficients.

A further object is to provide a device for the analogue solution of non-homogeneous differential equations with variable coefficients, the accuracy of the device being intrinsically very high.

Other objects and many of the attendant advantages of this invention will be readily appreciated as the same becomes better understood by reference to the following detailed description when considered in connection with the accompanying drawings wherein.

Figure 1:
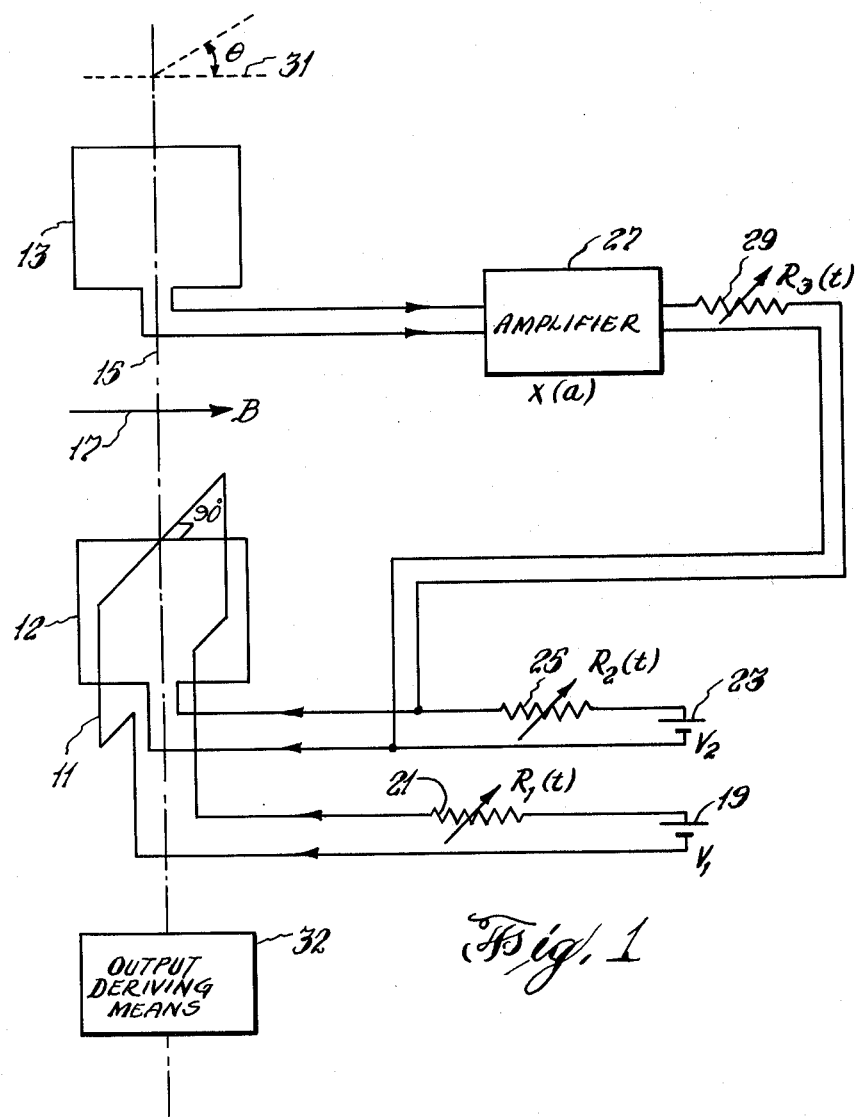
FIG. 1 is a schematic diagram illustrating the basic unit of the invention.

FIG. 1 illustrates the basic unit of the present invention. Three electrical coils 11, 12 and 13 are mechanically coupled to the same shaft 15. The coils are located in a "uniform" magnetic field of intensity B, the direction of which is indicated by the arrow 17. The planes of two of the coils 12 and 13 are parallel, while the plane of the third coil 11 is perpendicular to the direction of the magnetic field 17. The coil-and-shaft system has an appreciable amount of inertia.

The perpendicular coil 11 is in series with a source of voltage 19 and a time-function element 21 denoted by the symbol for a variable resistor. The voltage source 19 and the time-function element 21 comprise a time-function generator.

The second coil 12, whose plane is parallel to the direction of the external magnetic field 17, is in series with a source of voltage 23 and another time-function element 25.

The third coil 13, whose plane is also parallel to the direction of the external magnetic field 17, is connected to the input terminals of an amplifier 27, the amount of amplification provided by the amplifier being denoted by the symbol ($a$). The output of the amplifier 27 is fed through a third time-function element 29 to the second coil 12.

Driving currents are sent through coils 11 and 12, respectively, by the voltage sources 19 and 23. The movement of the coil-and-shaft system in the magnetic field 17 induces a current proportional to the rate of change of magnetic flux through the coil, which is determined by the rate of change of the rotational angle, $\theta$, of the coil and by the intensity, $B \cos \theta$, of the external magnetic field through which the coil is rotating. The induced current is therefore proportional to $(\dot{\theta}) \cos \theta$ in coil 13, and is amplified, modified in accordance with the time function $R_3(t)$ and fed back through coil 12.

The magnetic theory associated with this invention is simple electromagnetic theory derived basically from the Biot-Savart law of physics. Any good college textbook with a section on electromechanical systems will show the general derivation of the type of the second-order differential equation given below. For example, see section 1, chapter 6, of "Transform Method in Linear System Analysis," by J. Aseltine, published by the McGraw-Hill Book Co., Inc., in 1958, or Lynch and Truxal, "Signals and Systems in Electrical Engineering," which is one of the McGraw-Hill Electrical and Electronic Engineering Series books. According to this theory, the motion of the coil-and-shaft system of the device shown in FIG. 1 is described by the differential equation $$\ddot{\theta} + r(t)\dot{\theta} + s(t)\theta = f(t) \qquad \text{I}$$

In this equation, $$r(t) = -\frac{n_2 n_3 A_2 A_3 B^2}{I} \frac{a}{R_3(t)} \qquad \text{II}$$

$$s(t) = -n_1 A_1 \frac{B}{I} \frac{V_1}{R_1(t)} \qquad \text{III}$$

$$f(t) = n_2 A_2 \frac{B}{I} \frac{V_2}{R_2(t)} \qquad \text{IV}$$

where
$n_1$ is the number of turns of coil 11
$A_1$ is the area of coil 11

$n_2$ is the number of turns of coil 12
$A_2$ is the area of coil 12
$n_3$ is the number of turns of coil 13
$A_3$ is the area of coil 13
B is the intensity of the external magnetic field
I is the moment of inertia of the coil-and-shaft rotating system
a is the amount of amplification provided by the amplifier 27
$R_1(t)$ is the mathematical expression for the resistance function (with respect to time) of the variable resistor 21
$R_2(t)$ is the mathematical expression for the resistance function (with respect to time) of the variable resistor 25
$R_3(t)$ is the mathematical expression for the resistance function (with respect to time) of variable resistor 29
$V_1$ is the magnitude of the voltage of source 19
$V_2$ is the magnitude of the voltage of source 23.

The variable $\theta$ is generated by the motion of the rigid shaft and coil system according to the dynamical law that the rate of variation of the angular momentum, i.e., $$\frac{d}{dt}(I\dot{\theta}) = I\ddot{\theta}$$

is proportional to the applied torque (see the references previously given). The reason that the $\ddot{\theta}$ term appears in Equation I without a coefficient is that each term of the equation has already been divided by this coefficient.

Now, the number of turns in each coil, the areas and the moment of inertia of the system can be considered to be constant terms once the system has been constructed. The magnitudes of the voltage sources, the amount of amplification and the intensity of the external magnetic field, although they may be variable, are usually fixed in value. Thus, Equations II, III and IV may assume the forms given below, where the symbol $(k)$ denotes a constant:

$$r(t) = -\frac{k_3}{R_3(t)} \qquad \text{V}$$

$$s(t) = -\frac{k_1}{R_1(t)} \qquad \text{VI}$$

$$f(t) = +\frac{k_2}{R_2(t)} \qquad \text{VII}$$

In this event, it is clear that the time-functions $R_1(t)$, $R_2(t)$ and $R_3(t)$ are merely the inverse of the variable coefficients $r(t)$ and $s(t)$ and the driving function $f(t)$, respectively, in the differential equation which is to be solved. Solving the equation then becomes a matter of providing the proper time-functions and measuring the angular deviation, $\theta$, of the shaft 15 from its zero, or reference, position 31.

It should be noted again that the parameters $V_1$, $V_2$, $(a)$ and B need not be fixed but may also be variable in magnitude and with time, so that the variety of time-functions $r(t)$, $s(t)$ and $f(t)$ which may be reproduced becomes virtually unlimited.

The variable-resistors 21, 25 and 29 may, for example, comprise wire-wound resistors whose movable arms are coupled to move in correspondence with the movements of cam-followers which travel around the peripheries of cams cut to represent the time-functions $R_1(t)$, $R_2(t)$ and $R_3(t)$, respectively.

Electronic function generators, which provide an output voltage corresponding to a predetermined function may be employed as alternatives to the illustrated combination of variable resistor and voltage source, $R_1(t)$ and $V_1$, and $R_2(t)$ and $V_2$. In this case Equation II becomes $$s(t) = \frac{-n_1 A_1 B}{I}[I_1(t)] \qquad \text{VIII}$$

and Equation IV becomes $$f(t) = \frac{n_2 A_2 B}{I}[I_2(t)] \qquad \text{IX}$$

where $I_1(t)$ is the mathematical expression describing as a function of time the output current of the function generator which replaces variable resistor 21 and voltage source 19, and $I_2(t)$ is the mathematical expression describing as a function of time the output current of the function generator which replaces variable resistor 25 and voltage source 23.

The solution ($\theta$) may be recorded optically by means of a mirror attached to the shaft 15, or may be transformed into an electrical signal by any suitable means.

Suspension of the dynamic unit in the magnetic field may be accomplished in various well-known ways such as by means of jewel bearings, weak torsion fibers, air suspension, etc.

The basic unit can be used to represent and solve first-order differential equations. Equation I may be rewritten as $$I\ddot{\theta} - \left[n_2 n_3 A_2 A_3 B \frac{a}{R_3(t)}\right]\dot{\theta} - \left[n_1 A_1 B \frac{V_1}{R_1(t)}\right]\theta = \left[n_2 A_2 B \frac{V_2}{R_2(t)}\right] \qquad \text{X}$$

If the moment of inertia, I, of the system is made negligible, the first term of Equation X drops out and Equation X becomes a first order differential equation of the form $$u(t)\dot{\theta} + v(t)\theta = g(t) \qquad \text{XI}$$

The component factors of $u(t)$, $v(t)$ and $g(t)$ are evident from a comparison of terms in Equations X and XI.

Figure 2:
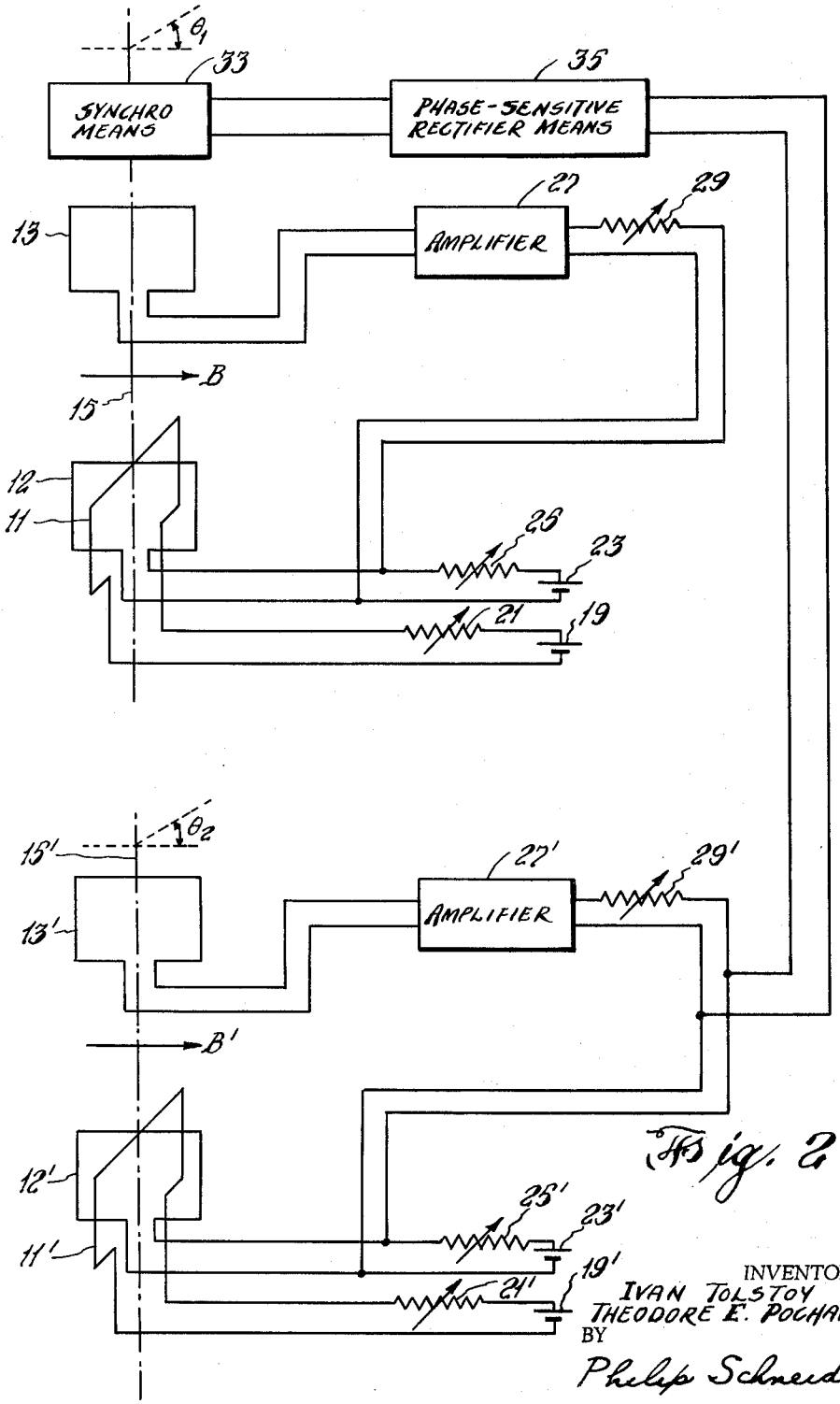
FIG. 2 is a schematic diagram illustrating how two units can be connected together to solve higher order differential equations.

The solution of the differential equation, the angle $\theta$, can be obtained as an output signal proportional to the angle of rotation of the shaft 15 by a number of means, indicated generally by the block labelled "Output Deriving Means 32." One means of deriving a D.C. output signal proportional to the angle of rotation of the shaft 15 is to use the synchro means 33 and the phase-sensitive rectifier 35 shown in FIG. 2. A reference which describes these components is provided hereinafter.

The solution of differential equations above the second order is made possible by the fact that a pair of differential equations both having ($\theta_1$) and ($\theta_2$) terms can usually be replaced by a single differential equation in ($\theta_1$) or ($\theta_2$) whose order is the sum of the orders of the original equations. Thus, it is possible to simulate third and fourth order equations by suitably coupling two of the basic units. FIG. 2 illustrates a method of coupling two basic units so that a linear function of the output of one basic unit is added to the angular output of the other basic unit. One method of obtaining an output signal which is proportional to the angle of rotation ($\theta_1$) of the first basic unit is to employ a synchro control transformer in conjunction with a synchro generator to obtain an A.C. signal which indicates the difference between the rotated angular position of the shaft 15 and that of the synchro generator (synchro generator is set to provide a reference position corresponding to the zero or unrotated position of the shaft). The signal is then rectified to obtain a D.C. signal the amplitude of which is proportional to the angle $\theta_1$. In FIG. 2, the synchro control transformer and synchro generator, together with power sources, is indicated generally in the block labelled "Synchro Means 33" and the D.C. rectifier is indicated generally in the block labelled "Phase-sensitive Rectifier Means 35." These means are described in many places in the literature, one description being given in NAVEXOS P-1590, Home Study Course, published by the Bureau of Aeronautics, U.S. Navy, in June 1957 (see the booklet entitled "Advanced Electronics Theory, Phase 7, Unit 1).

The rectified output signal from the phase-sensitive rectifier means 35 which comprises a D.C. voltage proportional to the angle of rotation ($\theta_1$) of shaft 15 is applied to coil 12′ of the second basic unit, as is also the output of coil 13′ after it has been amplified and modified in accordance with a predetermined time function.

Obviously many modifications and variations of the present invention are possible in the light of the above teachings. It is therefore to be understood that within the scope of the appended claims the invention may be practiced otherwise than as specifically described.

We claim:

1. A device for simulating non-homogeneous differential equations with variable coefficients comprising, in combination:
  means for establishing a time-invariant, uniform magnetic field;
  rotatable shaft means;
  three flat coils fixedly attached to said shaft means to form an assembly, said assembly being placed within said magnetic field so that, in the absence of driving currents in the coils, the plane of the first coil is perpendicular to, and the planes of the second and third coils are parallel to, the direction of said magnetic field;
  means for producing a current in said first coil in accordance with a predetermined function of time;
  means for producing a current in said second coil in accordance with a predetermined function of time; and
  means for modifying, in accordance with a predetermined function of time, the signal induced in said third coil by movement of said third coil and for feeding the modified signal back to said second coil.

2. A device for the analogue solution of non-homogeneous differential equations with variable coefficients comprising, in combination:
  means for establishing a time-invariant uniform magnetic field;
  rotatable shaft means;
  three flat coils fixedly attached to said shaft means to form an assembly, said assembly being placed within said magnetic field so that, in the absence of driving currents in the coils, the plane of the first coil is perpendicular to, and the planes of the second and third coils are parallel to, the direction of the magnetic field;
  means for producing a current in said first coil in accordance with a predetermined function of time;
  means for producing a current in said second coil in accordance with a predetermined function of time;
  means for modifying, in accordance with a predetermined function of time, the signal induced in said third coil by movement of said third coil and for feeding the modified signal back to said second coil; and
  means for deriving as an output the angular deviations of said shaft means from a reference position.

3. A rotatable device for simulating non-homogeneous differential equations with variable coefficients comprising, in combination:
  means for establishing a time-variant, uniform magnetic field, the intensity of the magnetic field being designated by the symbol (B);
  rotatable shaft means the angle of rotation of which, as measured from an unactivated reference position, is designated by the symbol ($\theta$);
  three flat coils fixedly attached to said shaft means to form an assembly, said assembly being placed within said magnetic field so that, in the absence of driving currents in the coils, the plane of the first coil is perpendicular to, and the planes of the second and third coils are parallel to, the direction of said magnetic field,
  the number of turns and area of the first coil being designated by the symbols ($n_1$) and ($A_1$), respectively,
  the number of turns and area of the second coil being designated by the symbols ($n_2$) and ($A_2$), respectively, and
  the number of turns and area of the third coil being designated by the symbols ($n_3$) and ($A_3$), respectively;
  means for producing a current in said first coil in accordance with a predetermined function of time, said current as a function of time being designated by the symbol $[I_1(t)]$;
  means for producing a current in said second coil in accordance with a predetermined function of time, said current as a function of time being designated by the symbol $[I_2(t)]$;
  means for modifying, in accordance with a predetermined function of time, the signal induced in said third coil by movement of said third coil and for feeding the modified signal back to said second coil, said function of time being designated by the symbol $[R_3(t)]$, and said modifying means including an amplifier having an amplification factor designated by the symbol ($a$),
  the motion of the coils and shaft means of said device being describable by the differential equation $$\ddot{\theta}+r(t)\dot{\theta}+s(t)\theta=f(t)$$

in which
  $\ddot{\theta}$ is the second derivative of $\theta$ with respect to time,
  $\dot{\theta}$ the first derivative of $\theta$ with respect to time, $$r(t)=\frac{-n_2 n_3 A_2 A_3 B^2}{I}\left[\frac{a}{R_3(t)}\right]$$

$$s(t)=\frac{-n_1 A_1 B}{I}[I_1(t)]$$

$$f(t)=\frac{n_2 A_2 B}{I}[I_2(t)]$$

and I is the moment of inertia of the coil and shaft means.

4. A device for simulating non-homogeneous differential equations with variable coefficients, said equations being higher than the second order, comprising, in combination:
  a first basic unit comprising, in combination,
    means for establishing a time-invariant, uniform magnetic field,
    rotatable shaft means,
    three flat coils fixedly attached to said shaft means to form an assembly, said assembly being placed within said magnetic field so that, in the absence of driving currents in the coils, the plane of the first coil is perpendicular to, and the planes of the second and third coils are parallel to, the direction of said magnetic field,
    means for producing a current in said first coil in accordance with a predetermined function of time,
    means for producing a current in said second coil in accordance with a predetermined function of time, and
    means for modifying, in accordance with a predetermined function of time, the signal induced in said third coil by movement of said third coil and for feeding the modified signal back to said second coil; and
  at least one other basic unit similar in structure to said first basic unit and including means for obtaining an output signal proportional to the angle of rotation of the shaft of said other basic unit,
    said output signal proportional to the angle of rotation of the shaft of said other basic unit being fed back to said second coil of said first basic unit.

5. A device for the analogue solution of nonhomogeneous differential equations with variable coefficients, said equations being higher than the second order, comprising, in combination:

a first basic unit comprising, in combination,
    means for establishing a time-invariant, uniform magnetic field,
    rotatable shaft means,
    three flat coils fixedly attached to said shaft means to form an assembly, said assembly being placed within said magnetic field so that, in the absence of driving currents in the coils, the plane of the first coil is perpendicular to, and the planes of the second and third coils are parallel to, the direction of said magnetic field,
    means for producing a current in said first coil in accordance with a predetermined function of time, and
    means for modifying, in accordance with a predetermined function of time, the signal induced in said third coil by movement of said third coil and for feeding the modified signal back to said second coil;
at least one other basic unit similar in structure to said first basic unit and including means for obtaining an output signal proportional to the angle of rotation of the shaft of said other basic unit,
    said output signal proportional to the angle of rotation of the shaft of said other basic unit being fed back to said second coil of said first basic unit; and
means for deriving as an output the angular deviations of the shaft of said first basic unit.

6. A device for simulating non-homogeneous differential equations with variable coefficients, said equations being higher than the second order, comprising, in combination:

a first basic unit comprising, in combination,
    means for establishing a time-invariant, uniform magnetic field,
    rotatable shaft means,
    three flat coils fixedly attached to said shaft means to form an assembly, said assembly being placed within said magnetic field so that, in the absence of driving currents in the coils, the plane of the first coil is perpendicular to, and the planes of the second and third coils are parallel, to the direction of said magnetic field,
    means for producing a current in said first coil in accordance with a predetermined function of time,
    means for producing a current in said second coil in accordance with a predetermined function of time, and
    means for modifying, in accordance with a predetermined function of time, the signal induced in said third coil by movement of said third coil and for feeding the modified signal back to said second coil; and
at least one other basic unit similar in structure to said first basic unit and including means for obtaining a D.-C. output signal proportional to the angle of rotation of the shaft of said other basic unit,
    said output signal proportional to the angle of rotation of the shaft of said other basic unit being fed back to said second coil of said first basic unit.

7. A device for the analogue solution of non-homogeneous differential equations with variable coefficients, said equations being higher than the second order, comprising, in combination:

a first basic unit comprising, in combination,
    means for establishing a time-invariant, uniform magnetic field,
    rotatable shaft means,
    three flat coils fixedly attached to said shaft means to form an assembly, said assembly being placed within said magnetic field so that, in the absence of driving currents in the coils, the plane of the first coil is perpendicular to, and the planes of the second and third coils are parallel, to the direction of said magnetic field,
    means for producing a current in said first coil in accordance with a predetermined function of time,
    means for producing a current in said second coil in accordance with a predetermined function of time, and
    means for modifying, in accordance with a predetermined function of time, the signal induced in said third coil by movement of said third coil and for feeding the modified signal back to said second coil;
at least one other basic unit similar in structure to said first basic unit and including means for obtaining a D.-C. output signal proportionad to the angle of rotation of the shaft of said other basic unit,
    said output signal proportional to the angle of rotation of the shaft of said other basic unit being fed back to said second coil of said first basic unit; and
means for deriving as an output the angular deviations of the shaft of said first basic unit.

References Cited by the Examiner

UNITED STATES PATENTS

| | | | |
|---|---|---|---|
| 2,535,250 | 12/1950 | Allen | 235—194 |
| 2,891,727 | 6/1959 | Kaufman | 235—193 |
| 2,950,430 | 8/1960 | Katz | 310—111 X |
| 3,128,429 | 4/1964 | Pattee | 235—183 X |

MALCOLM A. MORRISON, *Primary Examiner.*

K. W. DOBYNS, I. KESCHNER, *Assistant Examiners.*